March 16, 1948.   A. WYSS   2,438,088
DEVICE FOR DISCHARGING HOLLOW GLASSWARE BLOWN IN A FINISHING MOLD
Filed Jan. 10, 1946
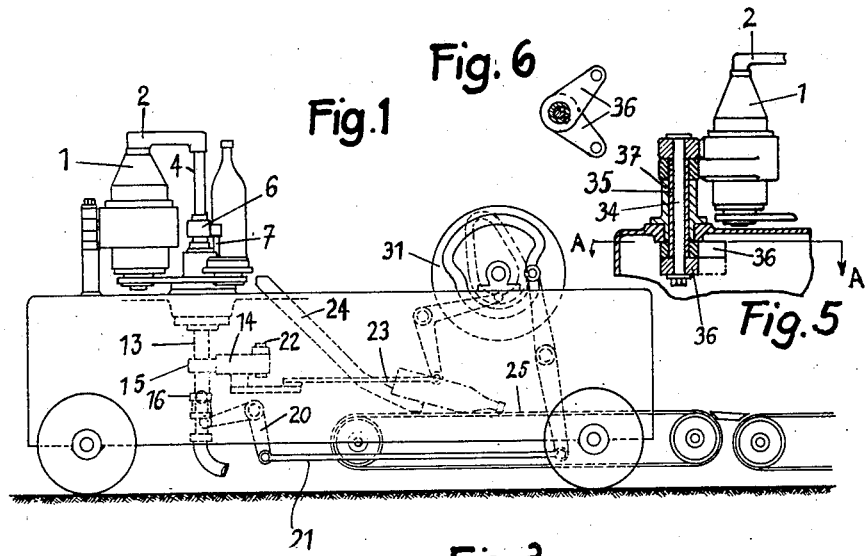
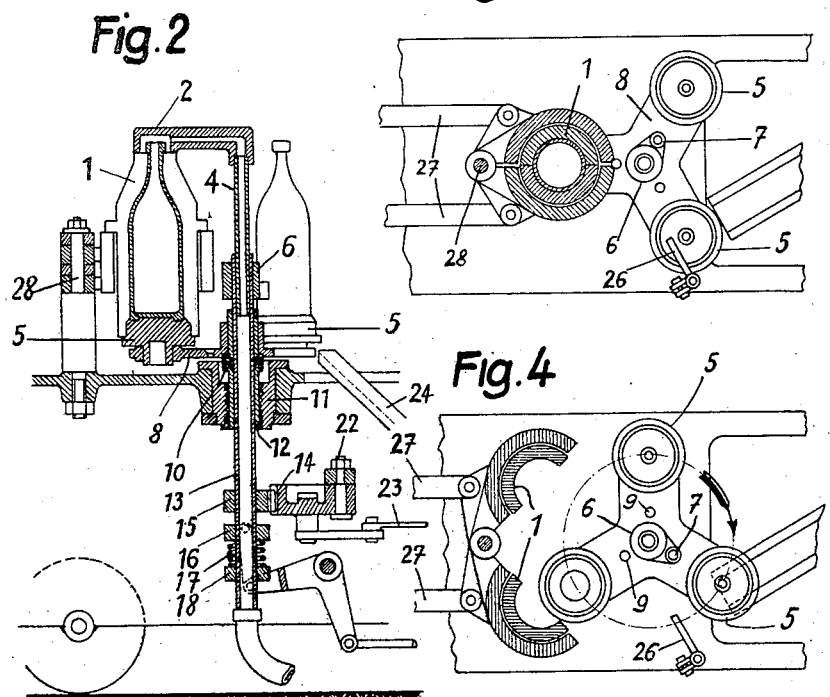
Inventor:
Alphons Wyss
by Sommers & Young
Attorneys Patented Mar. 16, 1948

2,438,088

UNITED STATES PATENT OFFICE 2,438,088

DEVICE FOR DISCHARGING HOLLOW GLASSWARE BLOWN IN A FINISHING MOLD

Alphons Wyss, Bottmingen, near Basel, Switzerland

Application January 10, 1946, Serial No. 640,218
In Switzerland January 17, 1945

9 Claims. (Cl. 49—18)

It is a well known fact that hollow glass articles when leaving the finishing mould of glass forming machines after the blowing operation are not yet sufficiently settled in order to be immediately transferred to the lehr. During the relatively short stay in the finishing mould the hot glass, being a bad heat conductor, does not transmit to the relatively colder finishing mould walls such a quantity of heat as to assure a sufficient setting of the blown article. In order to assure a sufficient degree of setting and to prevent sagging, the blown articles after leaving the finishing mould have to be submitted to a short mid-course cooling assuring the necessary degree of setting preceeding their transfer to the lehr. It is further a well known fact that the glass temperature on that occasion is not allowed to decrease beyond a certain minimum limit.

For the same purpose glass articles blown on multi-mould revolving forming machines, after leaving the finishing moulds, are preferably put on a slowly moving endless conveyor belt or revolving disc in order to be carried on to the lehr either by hand or mechanically as soon as a sufficient degree of setting is reached.

Glass articles blown on the single mould machines, after leaving the finishing mould, are for the same purpose put onto adjacent appropriated iron bottoms or cups of a lower temperature in order to be cooled. As soon as the necessary setting degree of the walls of the blown article is reached, which according to the kind of glass corresponds to one or more working cycles, the article is put on an endless conveyor belt leading to the lehr or is carried there manually by means of a ladle or pincers.

In this last case such a mid-course cooling necessitates a comparatively great amount of human auxiliary work and, because of the monotony of this kind of manual handling, deformations of the blown articles cannot be avoided.

With a device according to the present invention deficiencies of this kind are avoided. For that purpose the aforementioned setting operation of the blown articles follows immediately, on the forming machine itself, in accordance with the operating finishing mould so that the blown articles can be conveyed to the lehr immediately after their leaving the forming machine. Any hand manipulations for the aforementioned intermediate cooling are thus avoided.

The device according to the invention comprises two hinged finishing mould halves, adapted to perform an alternating opening and closing movement in timed relation to an intermittently revolving carrier bearing several mould bottoms which preceding the blowing operation are brought in succession under the mould halves forming a finishing mould in which the glass articles are blown, the said bottoms carrying away the blown article after each blowing operation in order to allow the glass articles of being preliminarily cooled or settled previous to their transfer to the lehr.

In using the device of this invention the shaped glass articles remain on the appertaining bottom moulds during the blowing or shaping of some further containers for being tilted sooner or later one by one, according to the degree of setting, on a chute or conveyor belt in accordance with the intermittent movement of the revolving carrier by means of an adjustable thrust-bar in order to be transferred directly to the lehr. Should the natural heat evacuation by radiation and contact with the bottom moulds be insufficient to assure an adequate degree of setting of the hot glass then the hot glass article as well as the finishing mould bottom, may be additionally cooled by a fresh air stream.

Details of a device according to the invention are disclosed on the accompanying drawings showing an application to a known type of single-mould machine, where the preshaped parison is lowered vertically for blowing between the two opened finishing mould halves. In the drawing Fig. 1 is a side view of the device;

Fig. 2 is an enlarged vertical longitudinal front part section of the device;

Figs. 3 and 4 are plan views of Fig. 2 partly in section, showing two different operating stages of the finishing mould;

Fig. 5 is a constructional modification;

Fig. 6 is a section according to line A—A in Fig. 5.

Hollow glass articles, in the present case bottles, are blown in the finishing mould 1 shown in Figs. 1 to 4.

The two halves of the finishing mould 1, forming a hinge, are according to Figs. 3 and 4 intermittently brought into an open and closed position by means of a known motion device of which only the connecting rods 27 are visible. A plurality of bottom moulds 5 mounted on a revolving carrier 8 are associated with these mould halves. The revolving carrier 8 is sustained on a vertical thrust bearing 10 disposed at the upper end of a vertical bush 12.

In order to allow a vertical adjustment of the revolving carrier 8, bush 12 is screwed into a nut-sleeve 11 fitted in the machine frame. The hollow arbor 13 telescoping with a small tolerance within the bush 12 is connected at its lower end to a compressed air pipe and bears at its upper end a telescopingly adjustable tube 4 the upper extremity of which bears a blow bell 2 cooperating the halves of the finishing mould 1. At the upper end of the hollow arbor 13 is furthermore fastened a collar 6 provided with a crank pin 7, engaging with the several centering holes 9 provided in the revolving carrier 8. Further down on the hollow arbor 13 a gear segment 15 is fixed engaging with another gear segment 14 oscillating on a pintle 22. This latter gear segment 14 is oscillated by means of a pushing rod 23 actuated by a cam disc 31 provided with two cam tracks and mounted on the machine frame and rotated by a driving gear not shown. Apart from the oscillating movement the hollow arbor 13 may further carry out an up and down movement also effected by cam disc 31. For this purpose connecting rod 21 articulates with a bell crank lever 20, the one arm of which is linked to a thrust collar 16, provided on the hollow arbor 13. The thrust collar 16 cushioned by a spring 17 reposes on a supporting part 18 of the machine frame.

The above described device operates as follows:

After the known fashioning of a bottle by blowing in the closed finishing-mould the hollow arbor 13 is slightly lifted, by the action of the cam 31 and connecting rod 21 pushing the thrust collar 16 against gear segment 15 whereby the blow bell 2 is lifted out of its contact with the top of finishing mould 1.

Immediately afterwards the flinshing-mould-halves are opened by means of rods 27 into the position shown in Fig 4, the blown blottle with the co-operating bottom 5 being set free for the circular moving. The hollow arbor 13 is now turned by means of cam 31, connecting rod 23 and gear segments 14, 15 over an angle of for example 120°. As the crank pin 7 remains engaged with one of the holes 9 of the revolving carrier 8 the latter prescribes a turning motion over the same angle. The corresponding turning motion is also carried out by the blow bell 2. Simultaneously the next mould bottom arrives at the blowing position for a new bottle. During the next working operation a new parison is lowered vertically between the opened finishing mould halves by means of a mechanism not shown and a new bottle is blown after their closure. Thus the stage shown in Fig. 3 is reached again. Now the hollow arbor 13 continues to be lifted thereby disengaging crank pin 7 of a hole 9 of the revolving carrier 8. Immediately afterwards the hollow arbor 13 is swung back and lowered so as to bring blow bell 2 back again into working position, whereby crank pin 7 engages again with the next following hole 9 of the revolving carrier 8 which remains arrested by means of the bottom engaged between the closed mould halves. The cycle of operations as described may now start again. It will be understood that the sequence of the movements of the different parts as described is so coordinated as to execute the different operations in a correct manner. The coordinated movement of the hollow arbor 13 and gearing parts are obtained by a suitable diposition of the tracks of cam disc 31.

It remains to be described what will be done with the blown bottles. It was indicated at the beginning that the stay of a blown bottle on the revolving carrier 8 corresponds to the manufacture of one or more further bottles. In the present case three mould bottoms are provided on the revolving carrier 8 so that always two bottles remain standing actually in the setting stage on the revolving carrier 8 outside the finishing mould. After two more turning motions of 120° each, the bottle being now sufficiently settled pushes against an adjustable thrust-bar 26, whereby it is tilted and tumbles on a chute 24 conducting to an endless belt 25 (Fig. 1) conveying the bottles one after the other to a lehr not shown. The thrust bar 26 may also be adjusted so as to tilt the blown bottle towards the chute 24 already at the end of the second turning motion of the revolving carrier 8, viz. before the blowing operation of the third bottle takes place. The instant of tilting the bottle is determined by the degree of setting of the glass article. If necessary, a fourth bottom mould may be provided on revolving carrier 8 but practically three bottom moulds per finishing mould will suffice. As the thrust bearing 10, 12 with the bottom mould revolving carrier 8 is, as previously mentioned, adjustable in height within the nut-sleeve 11 an easy compensation of any dilatation due to the heating of the different parts is rendered possible. In a similar manner it is possible to obtain a correct tightness between the touching faces of blow bell and finishing mould by adusting the tube 4 telescoping within the hollow arbor 13.

The disposition of the connecting rods 27 shown in Fig. 3 with the pivot 28 and mould halves 1 hinged upon is insofar disadvantageous as the space behind the finishing mould is obstructed. During operation therefore the access to the revolving carrier 8 is hindered, furthermore the articulations of this kind of closing mechanism are exposed to the influence of dust and heat.

As a difference to the known manner of evacuating the blown bottles from the finishing mould which generally consists in a simple tilting of the finishing mould bottom, the blown bottles are, in the present case, carried away on a circular path out from the opened finishing mould halves. In the first case the spreading of the mould halves is but a relatively slight one whereas in the present case this spreading of the mould halves is to be much greater and therefore is rendered difficult to be realised by the known connecting rods shown on Fig. 4 because of the necessarily long strokes.

All these operating deficiencies are avoided by the actuating mechanism according to Figs. 5 and 6 where one mould half is fitted on a sleeve 35 and the other on a pintle 34 inserted into the sleeve 35. Parts 34 and 35 on the other hand are hinged in a thrust bearing 37 and their lower ends, protruding into the interior of the machine frame, are symmetrically provided with swing levers 36 (Fig. 6), the ends of which are linked to the connecting rods 27.

I claim:

1. A device for discharging hollow glass articles blown in a finishing mould of a machine for fashioning hollow glass articles by blowing, comprising a finishing mould having associated mould halves adapted to be intermittently opened for receiving a parison and for discharging the blown article and to be closed during the blowing action, a turnable carrier, a plurality of mould bottoms supported by said carrier, and means to intermittently turn said carrier in timed relationship to the opening and closing of said mould halves to bring a mould bottom under the finishing mould halves for completing the finishing form before each blowing operation, and to carry away the blown article on continuing said intermittent turning motion, during which travel the blown articles are permitted to cool and set before their conveyance to the lehr.

2. A device of the type described, comprising a finishing mould having associated mould halves adapted to be intermittently opened for receiving a parison and for discharging the blown article and to be closed during the blowing action, a turnable carrier, a plurality of mould bottoms, a vertically adjustable thrust bearing for supporting said turnable carrier, and means to intermittently turn said carrier in timed relationship to the opening and closing of said mould halves to bring a mould bottom under the finishing mould halves for completing the finishing form before each blowing operation, and to carry away the blown article on continuing said intermittent turning motion, during which travel the blown articles are permitted to cool and set before their conveyance to the lehr.

3. A device of the type described, comprising a finishing mould having associated mould halves adapted to be intermittently opened for receiving a parison and for discharging the blown article and to be closed during the blowing action, a turnable carrier, a plurality of mould bottoms supported by said carrier, a machine frame, a vertically adjustable thrust bearing for supporting said turnable carrier and comprising a vertical bush screwed into a nut-sleeve located in said machine frame, and means to intermittently turn said carrier in timed relationship to the opening and closing of said mould halves to bring a mould bottom under the finishing mould halves for completing the finishing form before each blowing operation, and to carry away the blown article on continuing said intermittent turning motion, during which travel the blown articles are permitted to cool and set before their conveyance to the lehr.

4. A device of the type described, comprising a finishing mould having associated mould halves adapted to be intermittently opened for receiving a parison and for discharging the blown article and to be closed during the blowing action, a turnable carrier, a plurality of mould bottoms supported by said carrier, a machine frame, a vertically adjustable thrust bearing for supporting said turnable carrier and comprising a vertical bush screwed into a nut-sleeve located in said machine frame, a hollow arbor guided in said bush, a compressed air pipe connected to the lower end of said arbor, a blow-bell carried by the upper end of said arbor, means cooperating with said arbor and adapted to impart an oscillating movement to the latter, means cooperating with said arbor and adapted to impart a vertical displacement to the latter, and means to intermittently turn said carrier in timed relationship to the opening and closing of said mould halves to bring a mould bottom under the finishing mould halves for completing the finishing form before each blowing operation, and to carry away the blown article on continuing said intermittent turning motion, during which travel the blown articles are permitted to cool and set before their conveyance to the lehr.

5. A device of the type described, comprising a finishing mould having associated mould halves adapted to be intermittently opened for receiving a parison and for discharging the blown article and to be closed during the blowing action, a turnable carrier, a plurality of mould bottoms supported by said carrier, a machine frame, a vertically adjustable thrust bearing for supporting said turnable carrier and comprising a vertical bush screwed into a nut-sleeve located in said machine frame, a hollow arbor guided in said bush, a compressed air pipe connected to the lower end of said arbor, a blow-bell carried by the upper end of said arbor, means cooperating with said arbor and adapted to impart an oscillating movement to the latter, means cooperating with said arbor and adapted to impart a vertical displacement to the latter, a collar provided with a crank pin fixed to said hollow arbor and cooperating with said carrier for imparting an intermittent turning motion to the latter to bring a mould bottom under the finishing mould halves for completing the finishing form before each blowing operation, and to carry away the blown article on continuing said intermittent turning motion, during which travel the blown articles are permitted to cool and set before their conveyance to the lehr.

6. A device of the type described, comprising a finishing mould having associated mould halves adapted to be intermittently opened for receiving a parison and for discharging the blown article and to be closed during the blowing action, a turnable carrier, a plurality of mould bottoms supported by said carrier, a machine frame, a vertically adjustable thrust bearing for supporting said turnable carrier and comprising a vertical bush screwed into a nut-sleeve located in said machine frame, a hollow arbor guided in said bush, a compressed air pipe connected to the lower end of said arbor, a blow-bell carried by the upper end of said arbor, means cooperating with said arbor and adapted to impart a vertical displacement to the latter, and means to intermittently turn said carrier which means comprise a collar fixed to said hollow arbor, a crank pin provided on said collar and cooperating with a plurality of holes disposed in said turning carrier, whereby an insertion of said pin into said holes couples said carrier to said arbor to take part in one sense of said oscillatory movements imparted to said arbor and to bring a mould bottom under the finishing mould for the completion of the latter before each blowing, whilst said vertical displacement of said arbor uncouples the carrier from said arbor when the latter carries out the reciprocating movement in the opposite sense.

7. A device of the type described, comprising a finishing mould having associated mould halves adapted to be intermittently opened for receiving a parison and for discharging the blown article and to be closed during the blowing action, a turnable carrier, a plurality of mould bottoms supported by said carrier, a machine frame, a vertically adjustable thrust bearing for supporting said turnable carrier and comprising a vertical bush screwed into a nut-sleeve located in said machine frame, a hollow arbor guided in said bush, means including a cam disc provided with a cam track and operatively connected to said arbor and adapted to impart an oscillating movement to the latter, and means including the aforementioned cam disc and a second track on the latter and operatively connected to said arbor and adapted to impart an endwise reciprocating movement to said arbor.

8. A device of the type described, comprising a finishing mould having associated mould halves adapted to be intermittently opened for receiving a parison and for discharging the blown article and to be closed during the blowing action, a turnable carrier, a plurality of mould bottoms supported by said carrier, means to intermittently turn said carrier in timed relationship to the opening and closing of said mould halves to bring a mould bottom under the finishing mould halves for completing the finishing form before each blowing operation, and to carry away the blown article on continuing said intermittent turning motion, during which travel the blown articles are permitted to cool and set before their conveyance to the lehr, and an adjustably fixed abutment associated to the bottom moulds of said carrier for tilting the glass articles moved by said carrier against it.

9. A device of the type described, comprising a finishing mould having two associated mould halves adapted to be intermittently opened for receiving a parison and for discharging the blown article and to be closed during the blowing action, a sleeve on which one of said mould halves is fitted, a pintle inserted in said sleeve and having the other mould half fitted thereto, said pintle and said sleeve forming a hinged structure, two swing levers connected to said sleeve and pintle respectively, connecting rods linked to said swing levers, a turnable carrier, a plurality of mould bottoms supported by said carrier, and means to intermittently turn said carrier in timed relationship to the opening and closing of said mould halves to bring a mould bottom under the finishing mould halves for completing the finishing form before each blowing operation, and to carry away the blown article on continuing said intermittent turning motion, during which travel the blown articles are permitted to cool and set before their conveyance to the lehr.

ALPHONS WYSS.